May 6, 1952        F. G. BACK        2,595,750
OPTICAL SYSTEM AND ILLUMINATED RETICLE FOR REFLEX CAMERAS
Filed Feb. 3, 1951
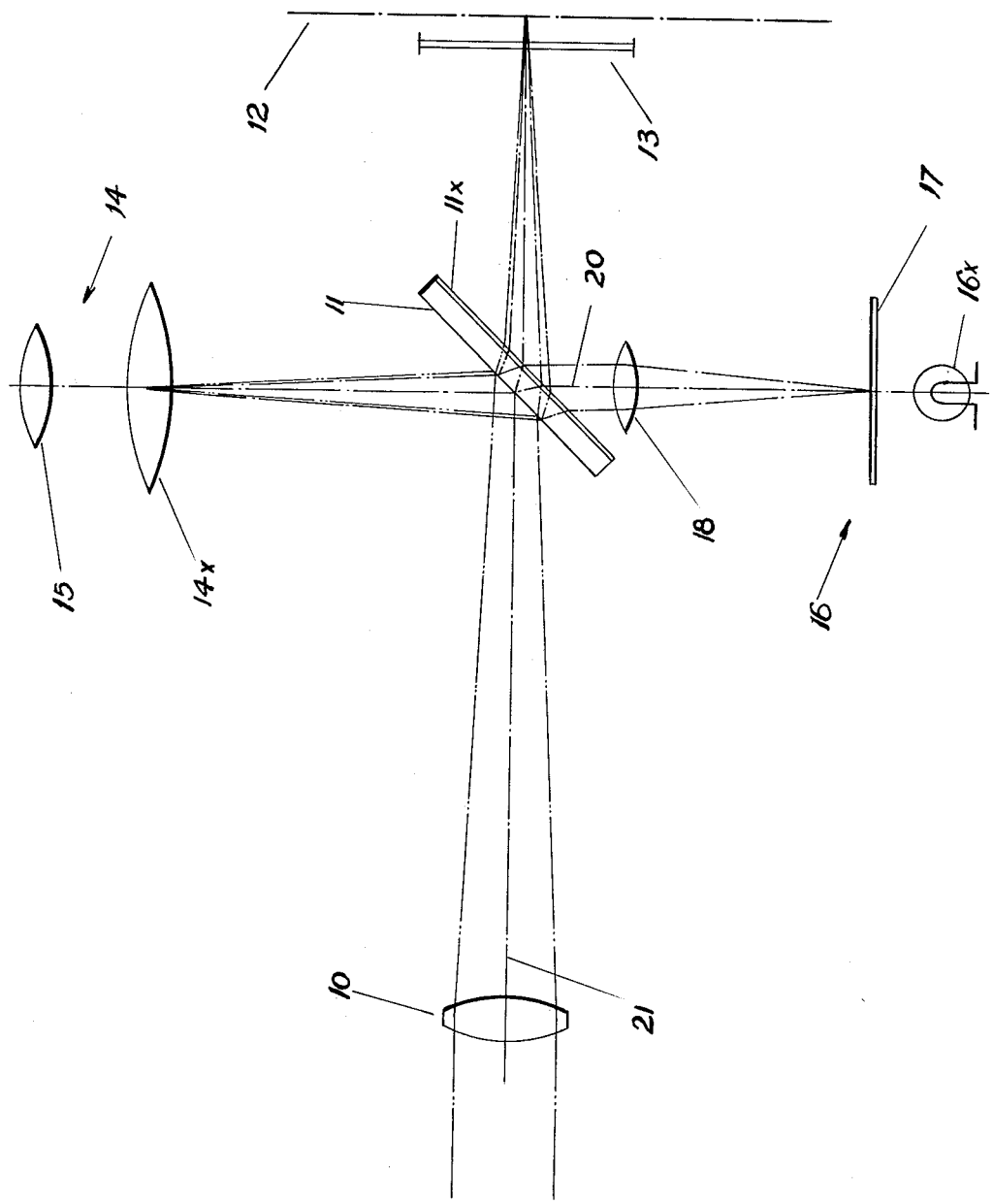
INVENTOR.
BY Frank G. Back Patented May 6, 1952

2,595,750

UNITED STATES PATENT OFFICE 2,595,750

OPTICAL SYSTEM AND ILLUMINATED RETICLE FOR REFLEX CAMERAS

Frank G. Back, New York, N. Y.

Application February 3, 1951, Serial No. 209,248

2 Claims. (Cl. 95—42)

This invention relates to new and useful improvements in reflex viewfinders for motion picture and other types of cameras and the like.

The conventional reflex viewfinders are based either on a single lens or on a twin lens system.

The single lens reflex finder system employs the same objective lens both for the observing of the object image and for the taking of the picture. Thus, as obvious, the reflex finder system has to be withdrawn when the picture is taken. It is therefore impossible to observe the object by means of the reflex system during the exposure.

The twin lens reflex viewfinder system is provided with a separate objective lens for the viewfinder. This arrangement permits continuous observation of the object, particularly during exposure. This system, however, has the disadvantage that there exists a parallactic difference between the object image as observed in the viewfinder and the object image as photographed by the camera through its objective lens.

It is an object of the present invention to combine the advantages inherent in each of the two basic systems while at the same time the inherent disadvantages have been completely eliminated.

It is accordingly a further object of the present invention to provide a parallax-free reflex viewfinder for cameras and the like which is adapted to permit continuous observation of the object, particularly during exposure.

It is a further object of the present invention to provide a parallax-free viewfinder permitting observation of the object during exposure when said viewfinder is combined with an arrangement which facilitates the superimposition of a reticle, both upon the viewfinder image and upon the image as reproduced on the film.

These and other objects and advantages of the present invention will be evident and apparent on hand of the detailed description of the preferred form of the invention as represented in the drawing in which the figure is a view inside elevation showing the system which in combination, comprises the invention.

Referring now to the specific form of the invention as shown in the drawing, it will be seen that the arrangement comprises an objective lens 10, or other objective means, a glass plate 11 located in the optical axis of said objective 10 and spaced rearward thereof. Said glass plate 11 is suitably inclined at an angle of 45° relative to the axis of the objective 10. Said glass plate 11 is coated on one side thereof with an antireflection coating 11x, for purposes which will be set forth and explained in detail hereinbelow.

Behind said glass plate 11 in the image plane of the objective 10, the film 12 is located, and a focal plane shutter 13 may suitably be interposed between glass plate 11 and film 12 if so desired.

An eyepiece 14 consisting of a field lens 14x and an eye lens 15 is positioned at right angles to the optical axis of the system, "objective . . . film." The eyepiece is arranged in such manner that the axis 20 of said eyepiece 14 intersects the axis 21 of said system "objective . . . film" at the point 22 where axis 21 impinges on glass plate 11.

Reticle reproduction means comprising a light source 16, a reticle 17, and a reticle reproduction lens 18, are located opposite the eyepiece arrangement on the other side of glass plate 11.

The greater part of the light rays coming from objective 10 pass through glass plate 11 and form an image on film 12. A smaller part of the light rays coming from objective 10 is reflected by glass plate 11, thus forming an image in the field lens 14x of the eyepiece 14.

In order to avoid double reflection and resulting double images, one surface of glass plate 11 is coated with an antireflection coating 11x. To make the antireflection coating more effective, glass plate 11 is preferably constructed of high-refractive glass.

In the preferred arrangement as shown in the drawings. The reticle printer 16 is combined with the viewfinder arrangement. The light rays from the light source 16x, after passing the reticle 17 and the reticle reproduction lens 18, are partially transmitted and partially reflected by glass plate 11. The transmitted rays image the reticle on to field lens 14x of the eyepiece 14, and the reflected rays image the reticle 17 upon the film 12. The reticle reproduction lens 18 has to be of such a power and has to be positioned in such a manner that the reflected light rays will form an image of the reticle 17 on the film 12 while the transmitted light rays properly form an image in the field lens 14x of the eyepiece 14.

While one specific embodiment of the preferred form of the present invention has been shown and described wherein an improved parallax-free viewfinder for continuous observation of the object during exposure, particularly, has been combined with a reticle printer adapted to form an image on the film and, concurrently in the eyepiece of the viewfinder, it is nevertheless understood that various modifications of the present invention may be apparent to those skilled in the art.

Variations and modifications of the present invention may be made, as obvious, without departing thereby from the spirit and scope of this invention and therefore the same is only to be limited by the scope of the prior art and the appended claims.

Having set forth and described the preferred form of my invention, what I desire to claim and secure by Letters Patent is:

1. An optical device for cameras and the like, comprising in combination, a glass plate, said glass plate being located in the optical axis of a camera objective lens, said glass plate being suitably inclined, and one side thereof being coated with an antireflection coating, an eyepiece at right angles to the optical axis of said camera objective lens, said eyepiece consisting of a field lens and an eye lens, a reticle reproduction system at right angles to the axis of said camera objective lens and opposite said eyepiece, said reticle reproduction system consisting of a light source, a reticle and a reticle reproduction lens, wherein said glass plate is adapted to respectively transmit and reflect rays coming from the camera objective lens and rays originating in said light source of said reticle reproduction system, said glass plate being adapted to transmit the greater portion of said light rays coming from said camera objective lens upon a film rearward of said glass plate and in the image plane of said camera objective lens, and to reflect the lesser portion of said rays into the field lens of the eyepiece and to reflect the lesser portion of said light rays coming from said light source upon said film and transmit the greater portion thereof into the field lens of said eyepiece.

2. In an optical device, in accordance with claim 1, the coated glass plate being constructed of glass of high refractive index, said antireflection coating and said high refractive glass construction cooperating to eliminate the formation of double images.

FRANK G. BACK.

REFERENCES CITED

The following references are of record in the file of this patent:

UNITED STATES PATENTS

| Number | Name | Date |
|---|---|---|
| 2,206,015 | Weissbrodt | July 2, 1940 |
| 2,210,090 | Lutz et al. | Aug. 6, 1940 |
| 2,508,562 | Bonner | May 23, 1950 |